United States Patent
Unal et al.

(10) Patent No.: US 7,336,401 B2
(45) Date of Patent: Feb. 26, 2008

(54) SYSTEMS AND METHODS FOR ESTIMATING AN IMAGE MARKING PROCESS USING EVENT MAPPING OF SCANNED IMAGE ATTRIBUTES

(75) Inventors: Gozde Unal, Atlanta, GA (US); Gaurav Sharma, Webster, NY (US); Reiner Eschbach, Webster, NY (US)

(73) Assignee: Xerox Corporation, Stamford, CT (US)

( * ) Notice: Subject to any disclaimer, the term of this patent is extended or adjusted under 35 U.S.C. 154(b) by 769 days.

(21) Appl. No.: 10/739,176

(22) Filed: Dec. 19, 2003

(65) Prior Publication Data

US 2005/0134934 A1 Jun. 23, 2005

(51) Int. Cl.
*H04N 1/40* (2006.01)

(52) U.S. Cl. ............ 358/448; 358/401; 358/504; 358/3.28; 382/165; 345/418; 345/581

(58) Field of Classification Search ............ 358/3.06, 358/448, 401, 504, 3.28; 382/165; 345/418, 345/581
See application file for complete search history.

(56) References Cited

U.S. PATENT DOCUMENTS

| | | | |
|---|---|---|---|
| 5,416,613 A | 5/1995 | Rolleston et al. ............ 358/518 |
| 5,481,380 A * | 1/1996 | Bestmann ................... 358/504 |
| 5,642,197 A | 6/1997 | Tuhro et al. |
| 5,668,890 A | 9/1997 | Winkelman ................. 382/167 |
| 5,710,872 A | 1/1998 | Takahashi et al. |
| 5,753,906 A | 5/1998 | Gennetten |
| 5,760,913 A | 6/1998 | Falk ............................ 358/298 |
| 5,806,081 A | 9/1998 | Swen et al. ................. 707/528 |
| 5,852,823 A | 12/1998 | De Bonet ........................ 707/6 |
| 5,974,279 A | 10/1999 | Slabbaert et al. ............. 399/61 |
| 5,978,107 A | 11/1999 | Murai et al. ................. 358/520 |
| 6,008,812 A * | 12/1999 | Ueda et al. .................. 345/418 |
| 6,031,618 A * | 2/2000 | Wang ......................... 356/419 |
| 6,035,065 A | 3/2000 | Kobayashi et al. ......... 382/201 |
| 6,069,973 A | 5/2000 | Lin et al. .................... 382/167 |
| 6,069,982 A * | 5/2000 | Reuman ..................... 382/275 |
| 6,088,095 A * | 7/2000 | Sharma ................... 356/243.5 |
| 6,141,120 A | 10/2000 | Falk ............................ 358/504 |
| 6,185,335 B1 | 2/2001 | Karidi et al. ............... 382/224 |
| 6,285,462 B1 | 9/2001 | Balasubramanian et al. . 358/1.9 |
| 6,337,923 B1 | 1/2002 | Yoon et al. |
| 6,353,675 B1 * | 3/2002 | Sharma ...................... 382/141 |
| 6,525,845 B1 * | 2/2003 | Sharma et al. ............. 358/504 |
| 6,633,408 B1 | 10/2003 | Rozzi |
| 6,791,711 B1 * | 9/2004 | Uekusa et al. ............... 358/1.9 |
| 6,814,290 B2 * | 11/2004 | Longacre ................. 235/462.1 |
| 2003/0168582 A1 * | 9/2003 | Bala et al. .................. 250/234 |
| 2003/0184772 A1 | 10/2003 | Agarwal |
| 2004/0027358 A1 * | 2/2004 | Nakao ........................ 345/587 |
| 2004/0264768 A1 * | 12/2004 | Sharma et al. ............. 382/165 |
| 2004/0264769 A1 * | 12/2004 | Sharma et al. ............. 382/165 |
| 2004/0264770 A1 * | 12/2004 | Sharma et al. ............. 385/165 |
| 2004/0264771 A1 * | 12/2004 | Sharma et al. ............. 382/165 |

* cited by examiner

*Primary Examiner*—Twyler L. Hoskins
*Assistant Examiner*—Jacky X. Zheng
(74) *Attorney, Agent, or Firm*—Oliff & Berridge, PLC

(57) ABSTRACT

Methods and systems used to automatically identify the marking process used for an image on a substrate based on spatial characteristics and/or color of the image. Image types which are classified and identified include continuous tone images and halftone images. Among halftone images separately identified are inkjet images, xerographic images and lithographic images. Locally adaptive image threshold techniques may be used to determine the spatial characteristics of the image.

38 Claims, 10 Drawing Sheets

SYSTEMS AND METHODS FOR ESTIMATING AN IMAGE MARKING PROCESS USING EVENT MAPPING OF SCANNED IMAGE ATTRIBUTES

BACKGROUND OF THE INVENTION

1. Field of Invention

This invention relates to automatically identifying a marking process used to form an image on a substrate.

2. Description of Related Art

In order to accurately calibrate a scanner, such as, for example, a color scanner, that scans an image carried on a substrate, different calibration transformations are required depending on the marking process, such as, for example, photography, inkjet printing, xerography, lithography and the like, and materials, such as, for example, toner, pigment, ink, etc., that are used to form the image on the substrate. For example, a calibration transformation that is used to calibrate the scanner for a photographic image is different from a calibration transformation that is used to calibrate the scanner for an ink jet-printed image, which is in turn different from a calibration transformation that is used to calibrate the scanner for a xerographically-formed image or for a lithographically-formed image.

Typically, a user wishing to scan an image determines the marking process used to form the image from prior knowledge of the marking process, manually identifies the marking process such as, for example, photographic, ink jet, xerographic or lithographic, and uses the marking process information to set the scanner so that an appropriate calibration can be used. The manual identification is commonly done using different descriptions, such as Halftone vs. Photo vs. Xerographic Copy on the user interface from which different machine settings are inferred.

Approaches to automatically identifying the marking process are disclosed in U.S. Pat. Nos. 6,353,675 and 6,031,618, each of which is incorporated herein by reference in its entirety. The approach to automatically identifying the marking process disclosed in the 618 patent uses additional spectral information from the scanned material obtained through additional spectral channels. The approach used to automatically identify the marking process disclosed in the 675 patent involves an image spatial analyzer that analyzes image data corresponding to the image to determine at least one spatial characteristic based on a power spectrum of the image data and a marking process detection system that detects the marking process based on the at least one spatial characteristic.

SUMMARY OF THE INVENTION

It would be desirable to perform analyses of the scanned image data directly from the scanned data, that is, without using any additional resources, to identify the marking process used to form that image. The inventors have determined that images carried on substrates exhibit unique spatial characteristics that depend upon the type of marking process used to form those images.

This invention provides methods and systems that automatically identify a marking process based on spatial characteristics of the marked image.

This invention separately provides systems and methods that automatically identify a marking process without the need to add one or more additional sensors.

This invention separately provides systems and methods that automatically identify a marking process without the need to use any additional data beyond that obtainable from the marked image using the standard scanner sensors.

This invention separately provides methods and systems that automatically differentiate between continuous tone and binary marking processes. Here, it is understood that binary marking processes can be obviously extended to marking processes locally using a small number of levels as it is done for example in some 7 or 8 head inkjet printing devices. The terms binary and halftone are used throughout this application to include those systems.

This invention separately provides methods and systems that automatically differentiate between different types of binary image marking processes, including, for example, inkjet marking processes, xerographic marking processes, and lithographic marking processes.

In various exemplary embodiments of the systems and methods according to this invention, continuous tone and halftone process images are differentiated by examining local variations of the input data, including using local variants as an estimator for local variations of the input data. In various other exemplary embodiments of the systems and methods according to this invention, a point pattern or event map is generated for each input data block based on a color level set processing technique. In various other exemplary embodiments of the systems and methods according to this invention, image spatial characteristics are identified by checking for halftone dot periodicity in the image. In various other exemplary embodiments of the systems and methods according to this invention, frequency, frequency relationships, and/or noise characteristics of scanned image data are employed to identify the image marking process. In various other exemplary embodiments of the systems and methods according to this invention, a determination whether or not the image has an underlying halftone rendition with a clustered or dispersed character may be performed.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

The inventors have determined that there is a strong correlation between the input media type and a number of measurable spatial image attributes obtainable directly from the scanned image data itself. Because there is a strong correlation between the input media type and these measurable spatial image attributes, the marking process used to form the scanned original can be ascertained, with a relatively high degree of confidence, from the statistical spatial properties of the scanned image data.

Typically, photographic printing, as well as any other analog image printing process, is a continuous tone, or "contone", marking process. Binary printing, however, typically involves a halftone process. Inkjet printing, for example, primarily or typically uses error diffusion/stochastic screens, while xerography, including color xerography, primarily or typically uses line-screens and/or clustered dot screens, and lithography primarily or typically uses clustered-dot rotated halftone screens. It should be appreciated that any of these binary marking techniques could have one of these halftone processes. However, the choices outlined above are predominant in typical usage, because of image quality and stability considerations.

Black and white images have variations in lightness and darkness. Color images have variations in color. Whereas variations in continuous tone images arise from variations in image data, halftone images have variations both from the image data and from the halftone reproduction process itself. Variations arising from the image data typically occur over much larger scales than the variations occur in halftone processes. Therefore, over a small scale, continuous tone images, such as photographic images, typically have a much smaller variation than do halftone images. Based on this, various exemplary embodiments of the systems and methods according to this invention look at local variations within the scanned image data to identify which marking process was used to render the image. That is, various exemplary embodiments of the systems and methods according to this invention look at local variations within the scanned image data to determine whether a continuous tone or photographic image marking process was used, or whether a halftone marking process was used. That is, in various exemplary embodiments of the systems and methods according to this invention, continuous tone image marking processes are differentiated from halftone image marking processes by examining local variations of the marked image input data.

Figure 1:
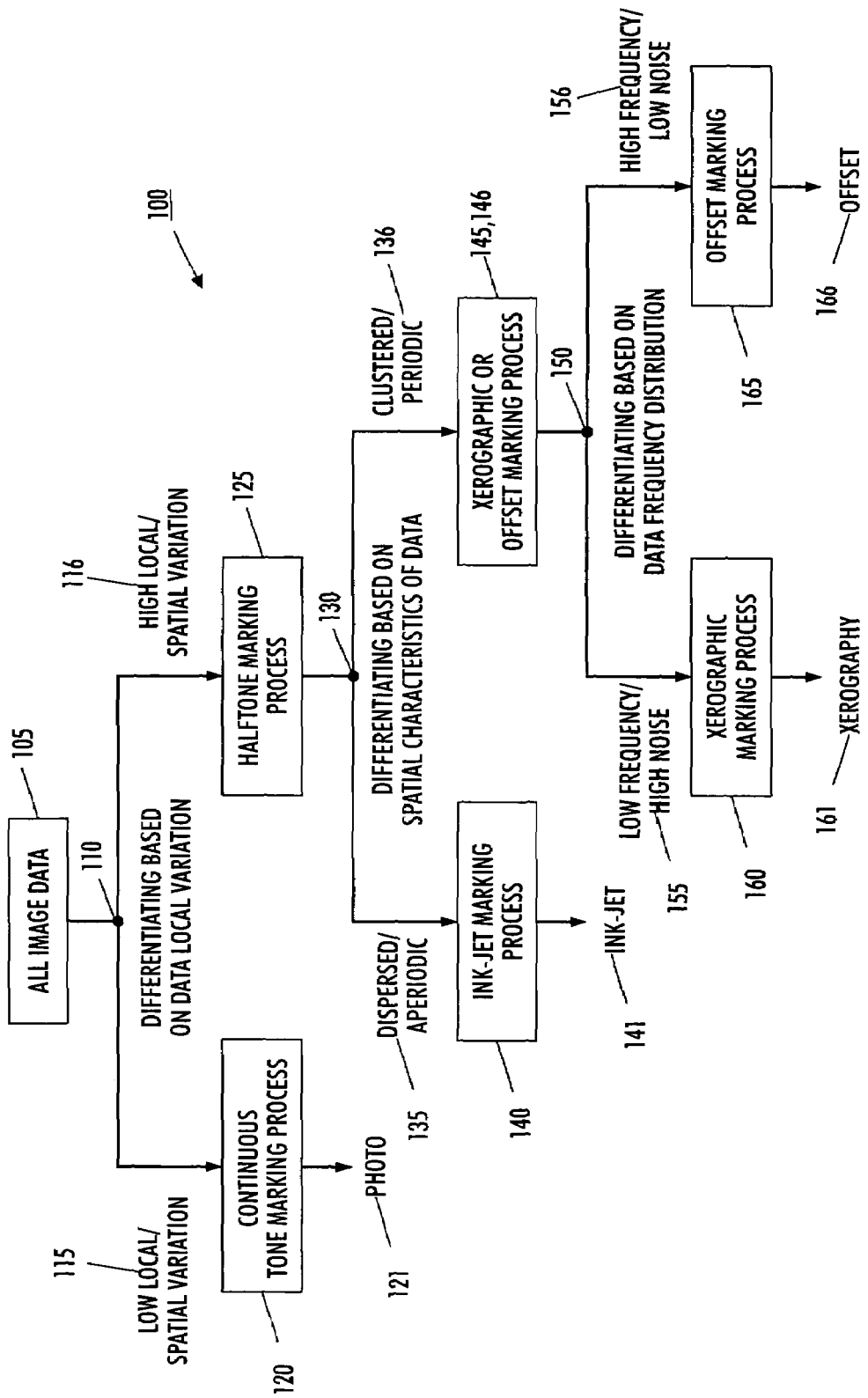
FIG. 1 shows one exemplary embodiment of a decision tree for a media identification process according to the invention.

FIG. 1 illustrates one exemplary embodiment of a decision tree 100 usable to perform image marking process/media identification according to the invention. In the decision tree 100 shown in FIG. 1, all image data 105 is evaluated. The first decision point 110 differentiates between a continuous tone image marking process 120 and a halftone image marking process 125 in a scanned image by examining local variations of the scanned image input data to determine whether there is low local/spatial variation 115 in the scanned image data or high local/spatial variation 116 in the scanned image data.

This distinction coincides with the distinction between a photograph or other analog image marking process and a binary image marking process. That is, determining continuous tone image data would imply that the image marking process for the scanned image data is a photo process, i.e., that the image is a photo 121.

Detecting a halftone marking process 125 would imply that the image marking process for the scanned image data is an ink-jet marking process 140, a xerographic marking process 145, an offset marking process 146, or the like.

In the exemplary embodiment of the decision tree 100 shown in FIG. 1, the next decision point 130 differentiates between the various halftone image marking processes 140, 145 and 146 by examining the spatial characteristics of the scanned image data to determine whether the data has a dispersed/aperiodic character 135 or a clustered/periodic character 136.

Detecting data having a dispersed/aperiodic character would imply that the image marking process for the scanned image data is an ink-jet marking process 140, i.e., that the image is an ink-jet image 141. On the other hand, detecting data having a clustered/periodic character would imply that the image marking process for the scanned image data is a xerographic marking process 145, an offset marking process 146, or the like.

In the exemplary embodiment of the decision tree 100 shown in FIG. 1, the next decision point 150 differentiates between a xerographic marking process 160 and an offset marking process 165 by examining the data frequency distribution or internal structure of the scanned image data. Image data internal structure examples that may be considered include determining whether the image data has a line structure as contrasted with a rotated structure, whether the halftone dots have a high frequency structure versus a low frequency structure, and whether the halftone screen noise is high or low.

Detecting image data having a low frequency/high noise character 155 would imply that the image marking process for the scanned image data is a xerographic marking process 160 that was used to create a xerographic image 161. On the other hand, detecting image data having a high frequency/low noise character 156 would imply that the image marking process for the scanned image data is an offset, or lithographic, marking process 165 that was used to generate an offset printed/lithographic image 166.

The decision tree of FIG. 1 is not intended to imply that data can not be reevaluated. In some cases, for example, data identified as ink-jet 141 might still be evaluated with respect to the data frequency distribution 150 and the result of this being used to verify, harden or reexamine the identification of the marking process of the image as an ink-jet marking process 140. The additional burden with respect to speed, processing time, etc. for verification is system dependent and might be negligible, in which case reexamination is advantageous. In other cases, a strict structure like the one shown in FIG. 1 is advisable. In addition, as will be appreciated by those skilled in the art, the decision process can be applied to the entire image as a single determination or can be applied individually or to parts of the image. These independent image portions may be determined by segmenting the image through an independent process. Furthermore, the decision process may be independently applied to small regions of the image and the results from these regions may then be pooled or combined to determine an image marking process. This pooling or combination can further use a measure of confidence for each region when determining the overall marking process.

Figure 2:
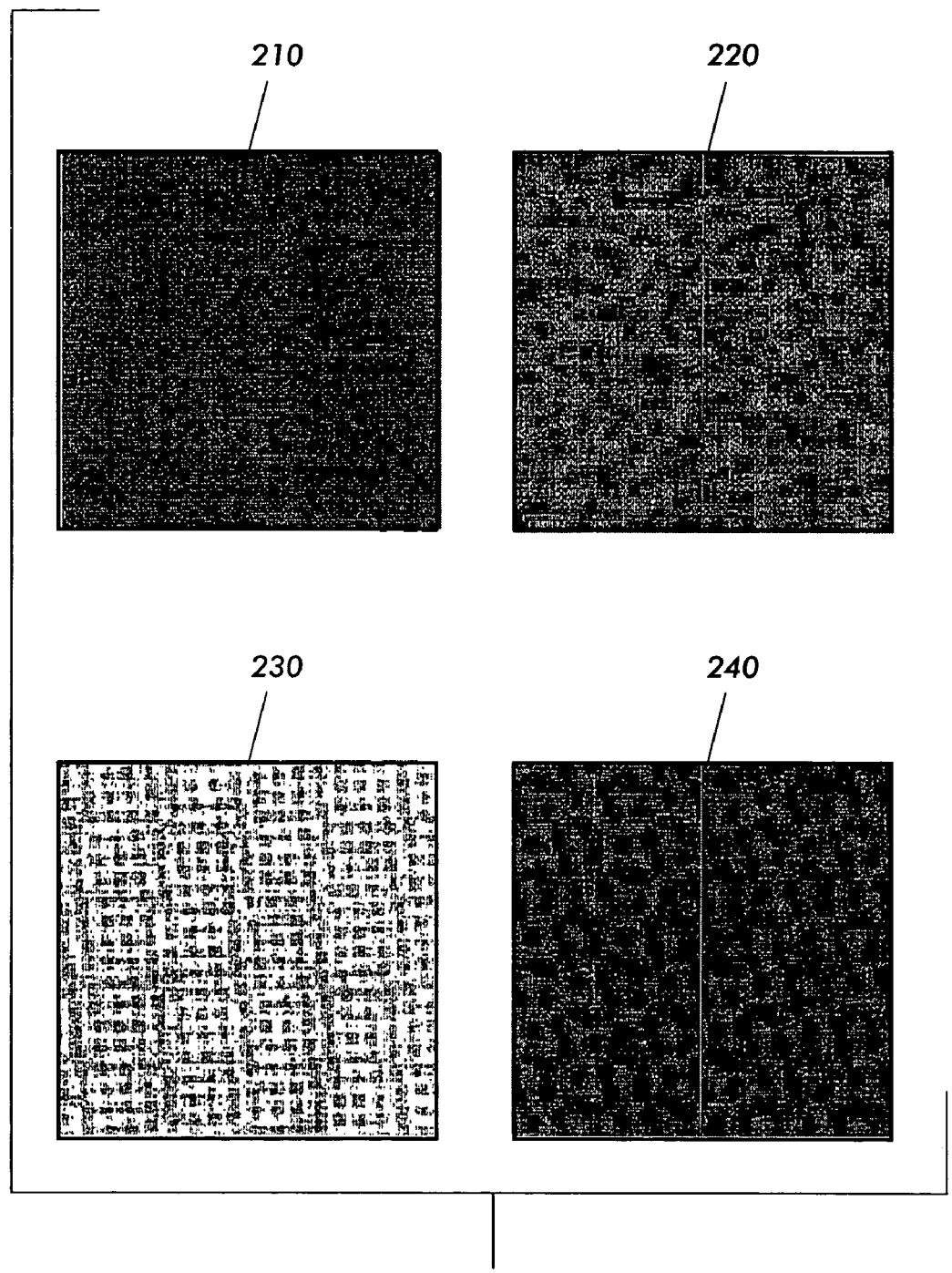
FIG. 2 shows enlarged views of scanned regions of an image formed using different image formation processes.

FIG. 2 shows in detail a number of scanned regions of a photograph 210, an inkjet marked image region 220, a lithographically-formed image region 230 and a xerographically-formed image region 240, scanned, for example, at 600 dots per inch (dpi). As shown in FIG. 2, the continuous or photographic image region 210 has a much smaller variation in the number of adjacent light and dark areas throughout the scanned region than do the halftone-type image regions 220-240. Additionally, as shown in FIG. 2, the halftone dots of the inkjet image region 220 have an aperiodic dispersed nature, while the halftone dots of the lithographically-formed image region 230 and the xerographically-formed image region 240 have strong periodic structures. Finally, as shown in FIG. 2, the lithographically-formed image region 230 has a higher spatial frequency of halftone dots and lower noise than does the xerographically-formed image region 240.

Figure 3:
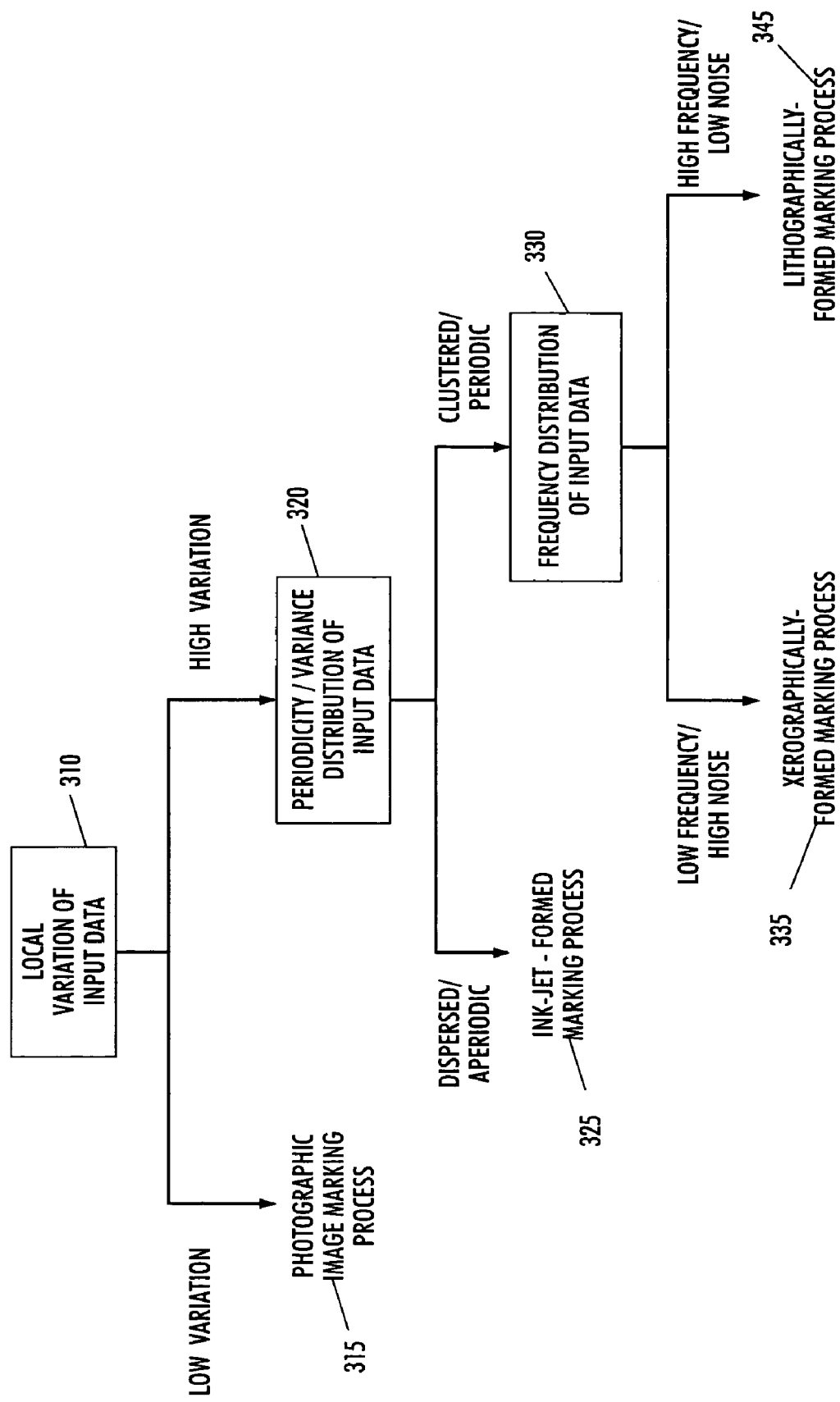
FIG. 3 shows one exemplary embodiment of a decision tree for a media identification process illustrating a correlation between input media type and measurable spatial image attributes using statistical differentiators.

FIG. 3 is a decision tree illustrating the correlation of the scanned image data with the input media determination process of FIG. 1 using statistical differentiators at each decision point 310, 320 and 330. In the exemplary embodiment shown in FIG. 3, just as in the exemplary embodiment shown in FIG. 1, the first decision block 310 differentiates between analog tone and binary image marking processes. As shown in FIG. 3, this is achieved by examining the local variations of the input data. An image formed by a binary image marking process typically shows a relatively high level of local variation compared to an image formed using an analog image marking process, such as a continuous tone image marking process, such as, for example, a photographic, image marking process. Accordingly, local feature variants may be used as an estimator for the local variation at this stage. As a result of the analysis in the first decision block 310, images created using an analog or continuous tone image marking process 315, such as, for example a photo image marking process 315, are separated from images created using other image marking processes.

The second decision block 320 of FIG. 3 differentiates between an inkjet image forming process 325 and other halftone image marking processes, such as, for example, a xerographic image marking process 335, an offset or lithographic image marking process 345, or the like. This is accomplished by examining various spatial characteristics of the scanned image data to determine whether the data has a dispersed/aperiodic character or a clustered/periodic character. In various exemplary embodiments, the second decision block 320 differentiates between an inkjet image marking process 325, and a xerographic image marking process 335 or an offset image marking process 345 by evaluating the rendering uniformity and periodicity of the observed spatial variation of the halftone dots to discriminate between clustered and dispersed dot rendering methods.

For example, inkjet-formed marking processes 325 use mainly distributed dot techniques, such as, for example, error diffusion, stochastic screening and/or blue noise screening. These processes commonly do not have a single fundamental periodicity across all gray levels. However, distributed dot techniques are extremely uncommon for xerographic image marking processes 335 or for lithographic or offset image marking processes 345. Xerographic image marking processes 335 and lithographic or offset image marking processes 345 typically use clustered halftone dot techniques that have a dot periodicity that is not a function of the input level. At the same time, distributed dot techniques have a higher uniformity than do clustered dot techniques.

The third decision block 330 of FIG. 3 differentiates between xerographic image marking processes 335 and offset or lithographic image marking processes 345 by analyzing frequency and noise characteristics of the scanned data. In one exemplary embodiment, the third decision block 330 differentiates between xerographic image marking processes 335 and offset or lithographic image marking processes 345 by evaluating the symmetry and frequency of the halftone dots. In general, line screens are common in xerographic image marking processes 335, but are uncommon in offset or lithographic image marking processes 345. Rotated dot schemes are also common in xerographic image marking processes. Based on these tendencies, the absolute frequency of the input screen, and its noise characteristics can be analyzed as part of the third decision block 330. In particular, high frequency, low noise screens may be associated with offset or lithographic image marking processes 345, while low frequency, high noise screens may be associated with xerographic image marking processes 335.

As noted above, in various exemplary embodiments of the systems and methods according to this invention, a group of pixels from a fairly small block or sub-region that may be considered to be roughly homogenous in terms of color or gray value can be examined. Since the image has no spatial variation over a homogeneous region, the spatial structure in the halftoned version of the image is entirely due to the halftoning technique. Such regions are therefore useful for analyzing the underlying halftone technique without interference from the image content. Often binarizing a related group of pixels in the block will reveal the spatial arrangements that take place in the image marking process, that is, halftone marking process or continuous tone marking process. Accordingly, in various exemplary embodiments of the systems and methods according to the invention, a block of a related group of image pixels is binarized to create a map that is indicative of image marking processes.

Figure 4:
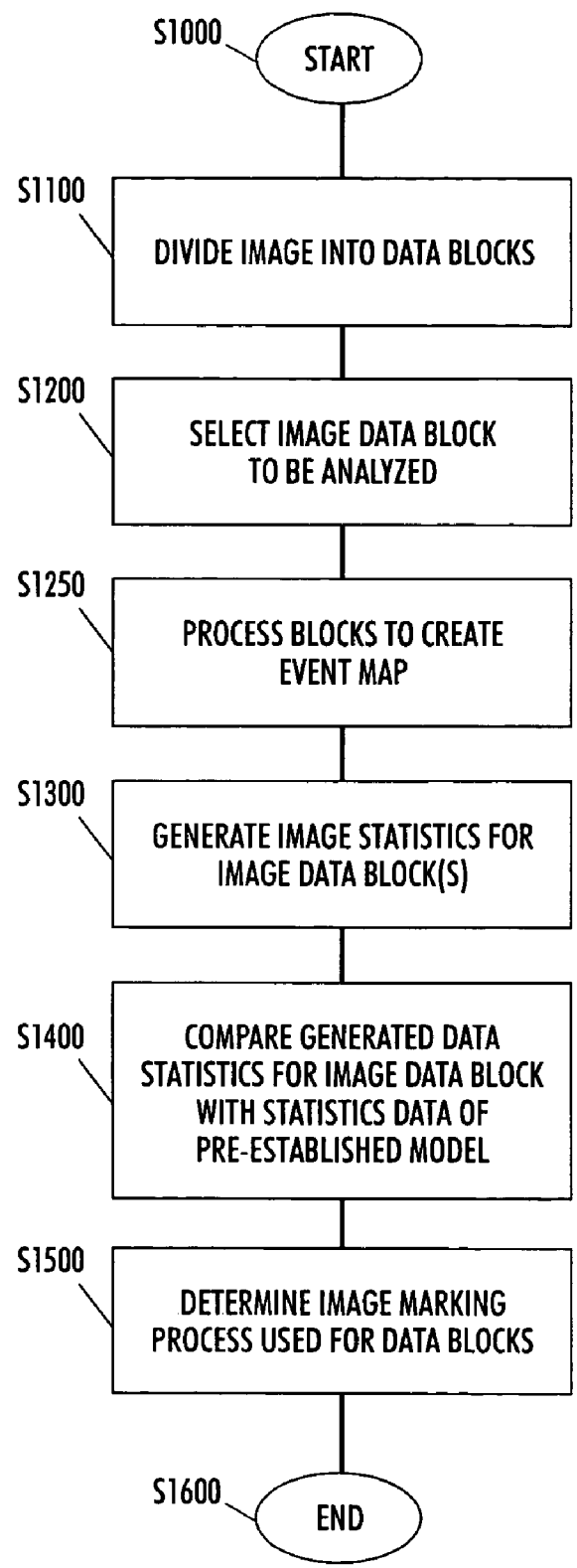
FIG. 4 is a flowchart outlining one exemplary embodiment of a method for determining the image marking process used to produce an image according to this invention.

FIG. 4 is a flowchart outlining one exemplary embodiment of a method for determining from scan image data of an image, the image marking process used to create an image according to this invention. As shown in FIG. 4, the method begins in step S1000, and continues to step S1100, where the scanned image data is divided into one or more data blocks, each having a determined number of pixels. In various exemplary embodiments of the methods and systems according to this invention, the scanned image data may be divided into data blocks or areas having any desired number of pixels. In one exemplary embodiment, the scanned image data may be divided into data blocks having 60×60 pixels for scanned images at 600 dpi. This division into blocks could be based on pure spatial considerations, e.g. location, but might also be influenced by additional information such as given by image segmenters and the like.

Then, in step S1200, the one or more image data blocks are selected to be analyzed or processed. In various exemplary embodiments of the methods and systems according to this invention, to obtain low-noise data, data blocks or areas that represent constant or near constant image data are preferably selected in step S1200. This tends to exclude image edges, paper background, and the like.

Next, in step S1250, the selected one or more image data blocks are processed to create or generate an event map or a point pattern. The event maps or point patterns display the regular and periodic structure of spatial dot arrangements resulting from xerographic and lithographic marking processes, and the dispersed and aperiodic structure of dots from inkjet marking process.

Then, in step S1300, each of the selected one or more image data blocks in the event maps/point patterns generated is processed to generate one or more data statistics for that image data block. In various exemplary embodiments of the methods and systems according to this invention, the one or more data statistics generated for the one or more image data blocks may include determining an average or mean value of the pixels for the image data block being processed, determining a variance value of the pixels for the image data block, determining the extremes, such as, for example, the minimum value, $\min_a$, and maximum value, $\max_a$, of the pixels for the image data block, generating histograms of the data being processed, and performing various data evaluations using the determined statistical values and histograms. To estimate if the input has significant and consistent periodicity, it is particularly beneficial to locate local minima along traversals through the image block, determine the distances between successive minima, and determine histograms of these inter-minima distances. A strong peak in a histogram of inter-minima distances indicates that a large number of minima are separated by a constant period, thereby implying periodicity. Local maxima can similarly be used, and a decision between the use of minima and maxima may be made based on image level, for instance. Operation then continues to step S1400.

In step S1400, the one or more data statistics generated for the one or more image data blocks are compared with image data statistics already determined and provided in an image data statistics model. Next, in step S1500, the results of comparing the one or more data statistics generated in step S1300 for the one or more image data blocks are used to determine the specific image marking process used to format the image. Operation then continues to step S1600, where operation of the method stops.

It should be appreciated that, in various exemplary embodiments, step S1400 can be omitted. In this case, operation of the method would proceed directly from step S1300 to step S1500. In general, step S1400 can be skipped.

Figure 10:
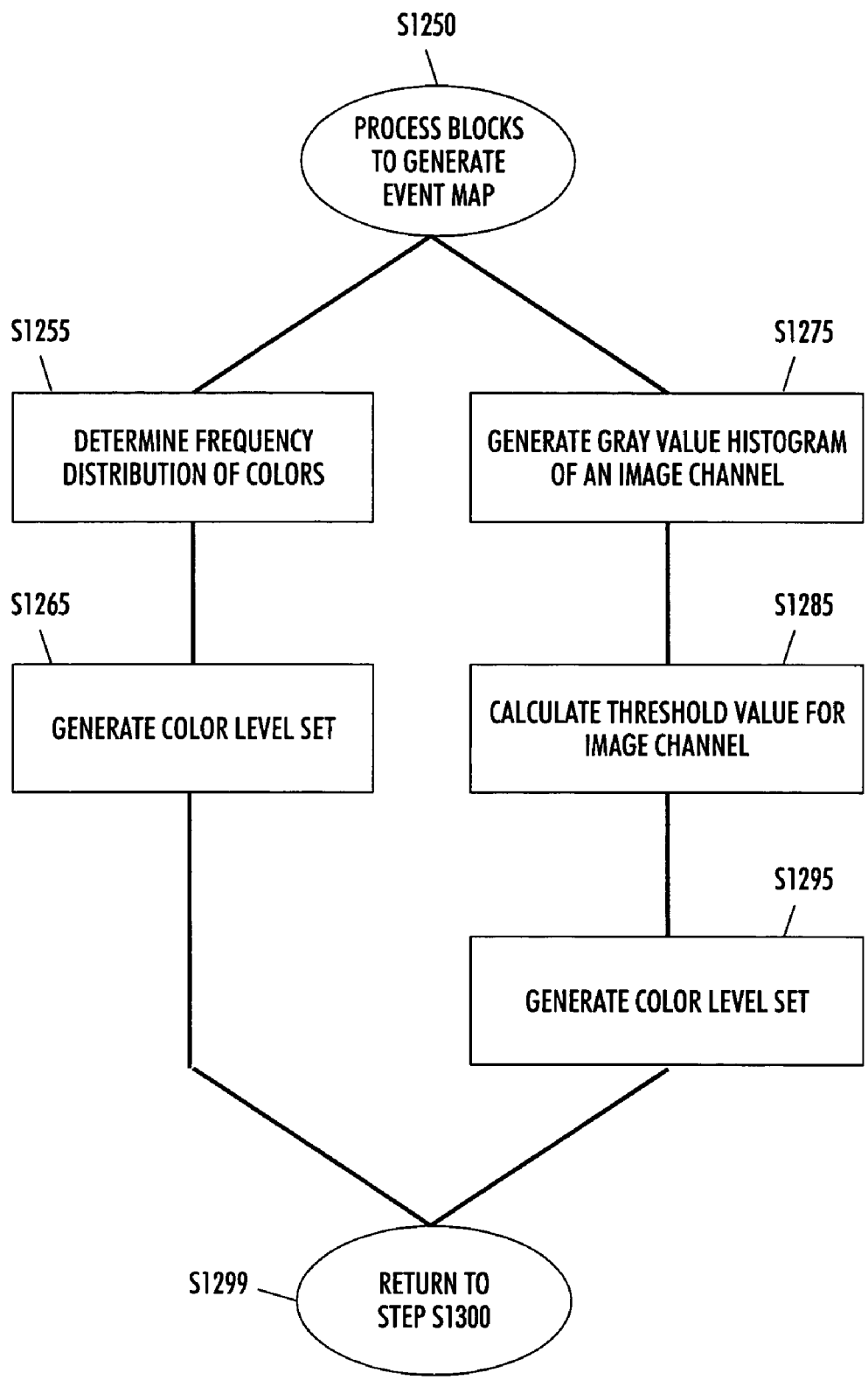
FIG. 10 is a flowchart outlining in greater detail one exemplary embodiment of the method for generating an event map of FIG. 4.

FIG. 10 is a flowchart outlining in greater detail one exemplary embodiment of the method for generating or creating an event map or point patterns of FIG. 4. As shown in FIG. 10, two exemplary embodiments of the method for creating an event map may be employed.

In one exemplary embodiment, operation the method begins in step S1250 and continues to step S1255, where frequency distribution of colors in the image input data block is determined. Next, the method continues to step S1265 where a color level set is generated. Then, in step S1299, operation returns to step S1300. This approach is based on the fact that a group of dots with a certain value, when viewed separately from dots with other colors, can represent the spatial underlying halftone value. This is equivalent to viewing a color level set of the color block, as described in the following paragraph.

If one assumes an image block area under study $A \subset R^2$ corresponds to spatial domain of a small block image $\vec{I}$ defined as: $\vec{I}: A \rightarrow R^3$. If color vector in $R^3$ is a color level set, $LS_c(x, y)$, is given by those spatial points $\{(x, y) \in R^2 : I(x, y) = \vec{c}\}$. This color level set, produces a point set where the event locations, i.e., the dots pixels corresponding to the selected color, are set to 1, whereas the remaining locations are set to 0. selection of a representative color value can be carried out by examining the frequency distribution of colors, that is the color histogram $H_c: R^3 \rightarrow N$. (N: natural numbers), of the block.

The scanned output produced by an input scanner for halftone input (not shown) has three separate channels, of which red channel corresponds approximately to cyan dots, green channel corresponds to magenta dots, and blue channel corresponds to yellow dots of the input media placed on the platen. Digital image data takes values not in real numbers but in integers, from 0 to 255. Each channel's gray values in [0, 255] of the color space $[0,255]^3 \equiv [0,255] \times [0,255] \times [0,255]$ is binned into N intervals, then an $N^3$ number of color cubes whose sides are of length $\Delta = 225/N$ can be used to find the color histogram $H_c$ of the image block. Each color $\vec{c} = (c_1, c_2, c_3) \in [0,255]^3$ falls into a color cube, and counting the frequency of color cubes used by the block results in the histogram of colors in the block. If there are $n_c$ number of color cubes $\vec{c}_i$, $i=1, \ldots, n_c$ for a given block, a color level set corresponding to a specific color cube (e.g., color with maximum frequency, or color whose frequency is close to mean frequency) is given by:

$$LS(x, y) = \begin{cases} 1, & \{(x, y) : \vec{I}(x, y) \in \vec{c}_i\} \\ 0, & \{(x, y) : \vec{I}(x, y) \notin \vec{c}_i\} \end{cases} \quad (1)$$

In an alternative exemplary embodiment, an event map or point sets may be created or obtained by generating a level set from each image channel separately. As shown in FIG. 10, operation the method begins in step S1250 and continues to step S1275, where a grey value histogram of an image channel is generated. Next, the method continues to step S1285 where a threshold value for each image channel is determined. After determining the threshold grey value, the level set for a color level set is generated in step S1295. Then, in step S1299, operation returns to step S1300.

In the alternative exemplary embodiment, gray value histogram of a channel is utilized, and a threshold value calculated from the histogram is used to generate a binary set. For a color block, the gray histogram of each image channel can be assumed to be bi-modal except for very light and very dark intensity blocks. This assumption relies on the fact that halftone dot structure usually manifests itself in terms of minority gray values on majority background values. Thus, the histogram will generally be bi-modal and asymmetric.

The threshold level from the normalized histogram $H:[0, 255] \rightarrow [0,1]$ (real interval) may determined as follows. First, to overcome noise effects, a lower gray value $g_{low} \in [0,255]$, and an upper gray value $g_{up} \in [0,255]$, are determined to compute the gray intensity range of the block. For instance, $g_{low}$ and $g_{up}$ correspond to 2 percentile and 98 percentile gray values, i.e., for $g \in [0,255]$, $$\int_0^{g_{low}} H(g) \, dg = 0.02, \text{ and } \int_0^{g_{up}} H(g) \, dg = 0.98.$$

Then gray value that is in the middle range can be found as the average of these two values:

$$g_{mid} = \frac{g_{low} + g_{up}}{2}.$$

Similarly, the 50 percentile gray value is determined by g50:

$$\int_0^{g50} H(g)\,dg = 0.50.$$

Since a gray histogram is bi-modal without symmetry, it is expected that $g_{mid}$ and g50 to have an offset value g50-$_{mid}$. Picking $(g50+g_{mid})^2$ as a threshold value separates the histogram into two parts. However, in order to extract spatial pattern of those pixels whose intensity values fall into minority cluster in the histogram, a threshold value that corresponds to $g_{thresh} = 2g_{mid} - g50$ may be used as an exemplary embodiment of the system and method of this invention. After finding the threshold gray value, the point set of a single image channel, I(x,y), is obtained from the lower (or upper) level set defined as:

$$LS(x, y) = \begin{cases} 1, \{(x, y): I(x, y) < g_{thresh}\} \\ 0, \{(x, y): I(x, y) \geq g_{thresh}\}. \end{cases} \quad (2)$$

As discussed above, Applicants have found that the point patterns clearly display the regular and periodic structure of spatial dot arrangements resulting from xerographic and lithographic printing process and the dispersed and periodic structure of dots from inkjet printing process.

Figure 5:
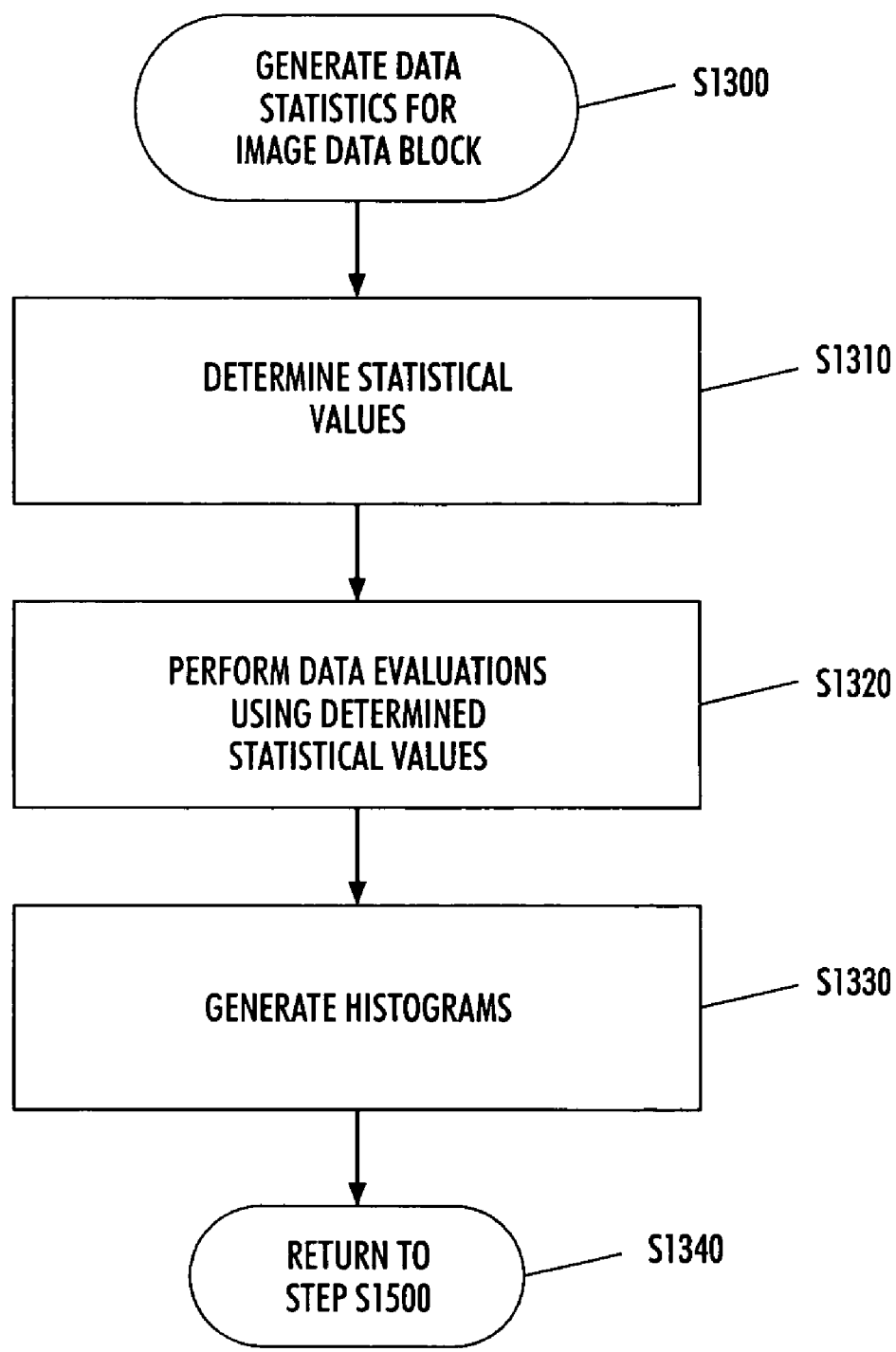
FIG. 5 is a flowchart outlining in greater detail one exemplary embodiment of the method for generating data statistics of FIG. 4.

FIG. 5 is a flowchart outlining in greater detail one exemplary embodiment of the method for generating the data statistics of FIG. 4. As shown in FIG. 5, operation of the method begins in step S1300 and continues to step S1310, where statistical values or parameters are determined over the selected data block or pixel area. In various exemplary embodiments, any or all of a number of statistical values or parameters may be determined, such as, for example, an area average or mean <A> of the pixels for the image data block, an area variance $\sigma_a$ of the pixels for the image data block, and the extreme minima and maxima values, $\min_a$ and $\max_a$ of the pixels for the image data block. The determined statistical values or parameters may be determined using well known spatial statistics methods or techniques.

Then, in step S1320, various data evaluations are performed using the determined statistical values or parameters. In one exemplary embodiment of the methods and systems according to this invention, data evaluations may include determining a ratio of the area variance $\sigma_a$ to mean <A> determined for a given block, determining the distribution of the mean values <A> for large pixel areas, comparing the determined mean value <A> to the determined $\min_a$ and/or $\max_a$ values, determining a distance between local maxima/minima, and the like.

Next, in step S1330, histograms are generated using the results of the data evaluations performed in step S1320. Then, in step S1340, operation returns to step S1500.

Figure 6:
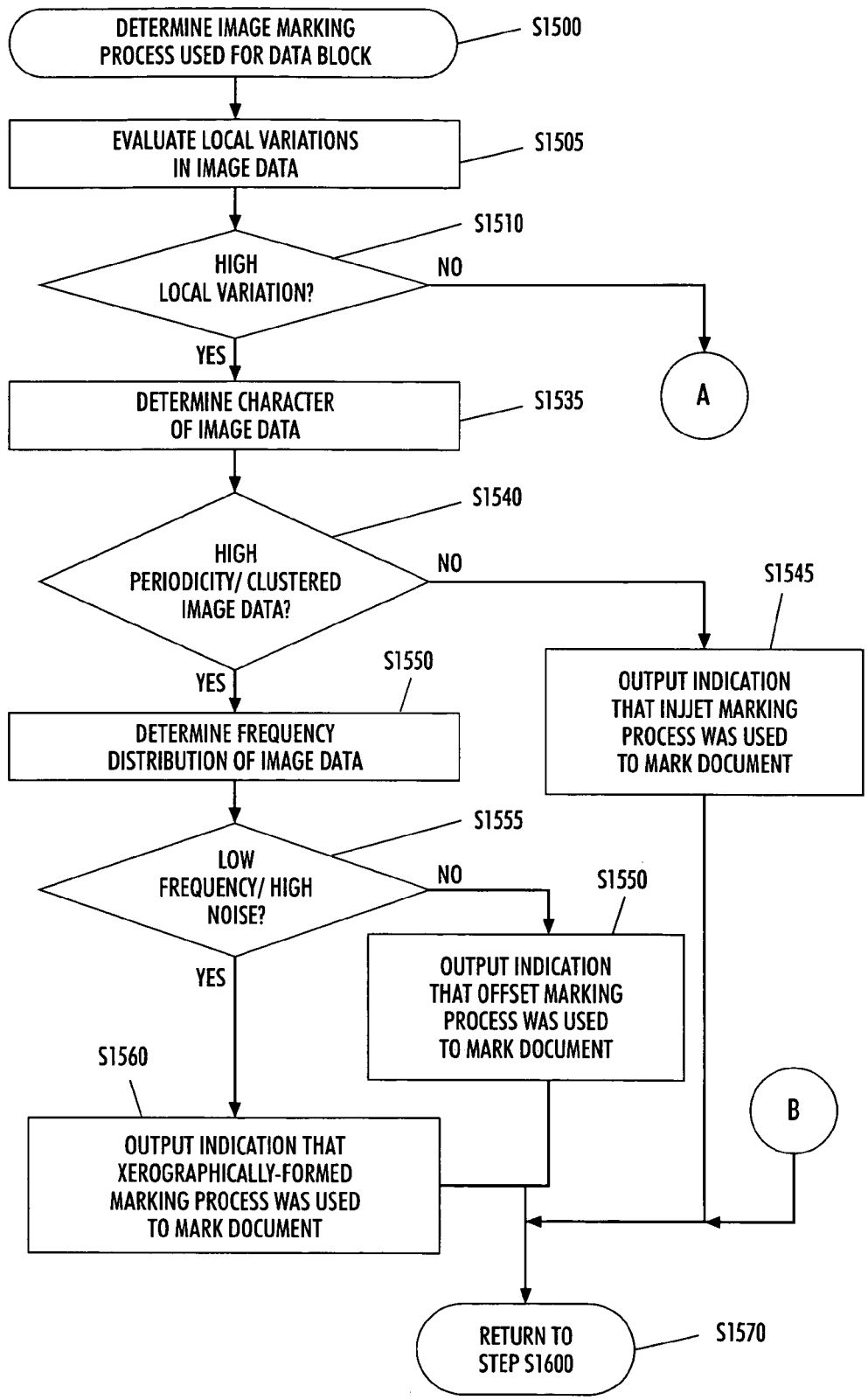
FIGS. 6 and 7 is a flowchart outlining in greater detail one exemplary embodiment of the method for determining the process used to produce a given data block of FIG. 4.
Figure 7:
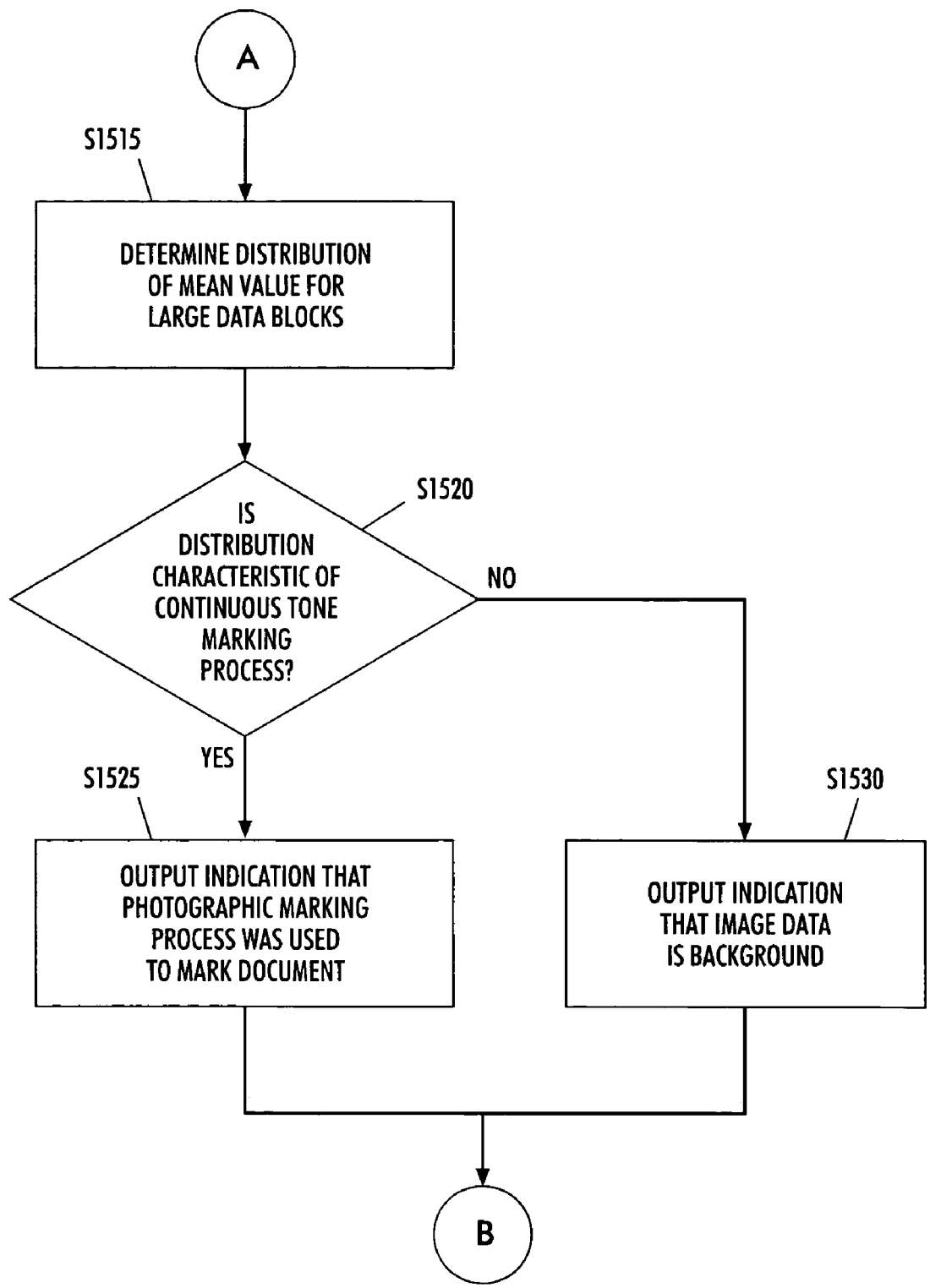

FIGS. 6 and 7 illustrate a flowchart outlining in greater detail one exemplary embodiment of determining the image marking process of FIG. 4. As shown in FIGS. 6 and 7, operation of the method begins in step S1500 and continues to step S1505, where local variations in image data are evaluated to distinguish between a continuous tone image marking process and other halftone marking processes. In various exemplary embodiments of the methods and systems according to this invention, in step S1505, area variance is used as an estimator for local variation in the image data. In various exemplary embodiments, the area variance to mean ratio is used to evaluate local variations in the image data. The area variance to mean ratio is directly used to distinguish halftone marking processes from a continuous tone marking process or background areas, as discussed below.

Then, in step S1510, a determination is made whether the image data evaluated exhibits high local variation. As discussed above, a continuous tone image, for example, a scanned photographic image, exhibits a much smaller local variation than halftone images, such as, for example, an inkjet-formed image, a xerographically-formed image or a lithographically-formed image. If the image data does not exhibit high local variation, it is likely that the image marking process used to form the image is a continuous tone image marking process or the image data contains significant background noise. It should be noted that in any image marking process, some local areas might exhibit low variance, for example in image highlight and shadow regions, or in other solid color areas. Accordingly, if the image data does not exhibit high local variation, operation continues to step S1515. If image data exhibits high local variation, operation continues to step S1535.

As shown in FIG. 7, in step S1515, a distribution of the mean value over large data blocks/areas is determined or analyzed to distinguish between a continuous tone image marking process and background noise. Next, in step S1520, a determination is made whether the distribution of the mean value is characteristic of a continuous tone marking process. If so, operation continues to step S1525. Otherwise, operation jumps to step S1530. In step S1525, the image marking process is identified as or determined to be a photographic image marking process. Operation then jumps to step S1570. In contrast, in step S1530, the image data is identified and/or classified as background noise. Operation then also jumps to step S1570. It should be appreciated, that, if the background data blocks were not suppressed, their classification as "photo" data blocks could swamp all rendering-derived image signatures.

As shown in FIG. 6, in step S1535, the image data is evaluated for its periodicity characteristics. In various exemplary embodiments of the methods and systems according to this invention, in step S1535, the data block mean value is compared to the determined $\min_a$ and $\max_a$ values to distinguish the minority pixels in the distribution. The minority pixels are generally either light pixels on a dark background or dark pixels on a light background. This distinction is made as noise suppression, such that only minority pixels are analyzed further because the halftone characteristics are better identified by considering the distribution of the minority pixels.

Next, in step S1540, a determination is made whether the evaluated image data has a clustered character with high periodicity. If image data does not have high periodicity, operation continues to step S1545. Otherwise, operation jumps to step S1550. In step S1545, the image marking process used to create the scanned image is determined to be an inkjet image marking process. As discussed above, inkjet-based marking processes use mainly distributed dot techniques, such as, for example, error diffusion, stochastic screening, frequency modulation, and/or blue noise screening, which do not have a single fundamental periodicity across all gray levels. Operation then jumps to step S1570.

In contrast, in step S1550, the frequency and noise characteristics of the scanned image data are evaluated to further distinguish between a xerographic image marking process and an offset-marking process. In various exemplary embodiments of the methods and systems according to this invention, in step S1550, the absolute frequency of the input screen is determined and the noise characteristics of the screen are examined. In one exemplary embodiment, in step S1550, after the minority pixels are identified, the distance between maxima/minima corresponding to subsequent minority pixels is determined, excluding a small region around the mean to exclude noise.

Next, it step S1555, a determination is made whether the scanned image data has a low frequency, high noise character. If so, operation continues to step S1560. Otherwise, operation jumps to step S1565. In step S1560, image marking process is determined to be, and/or is identified as, a xerographic image marking process. Operation then jumps to step S1570. In contrast, in step S1565, the image marking process is determined to be, and/or is identified as, an offset image marking process because high frequency, low noise screens are correlated with offset input. Operation then continues to step S1570, where the operation of the method returns to step S1600.

Figure 8:
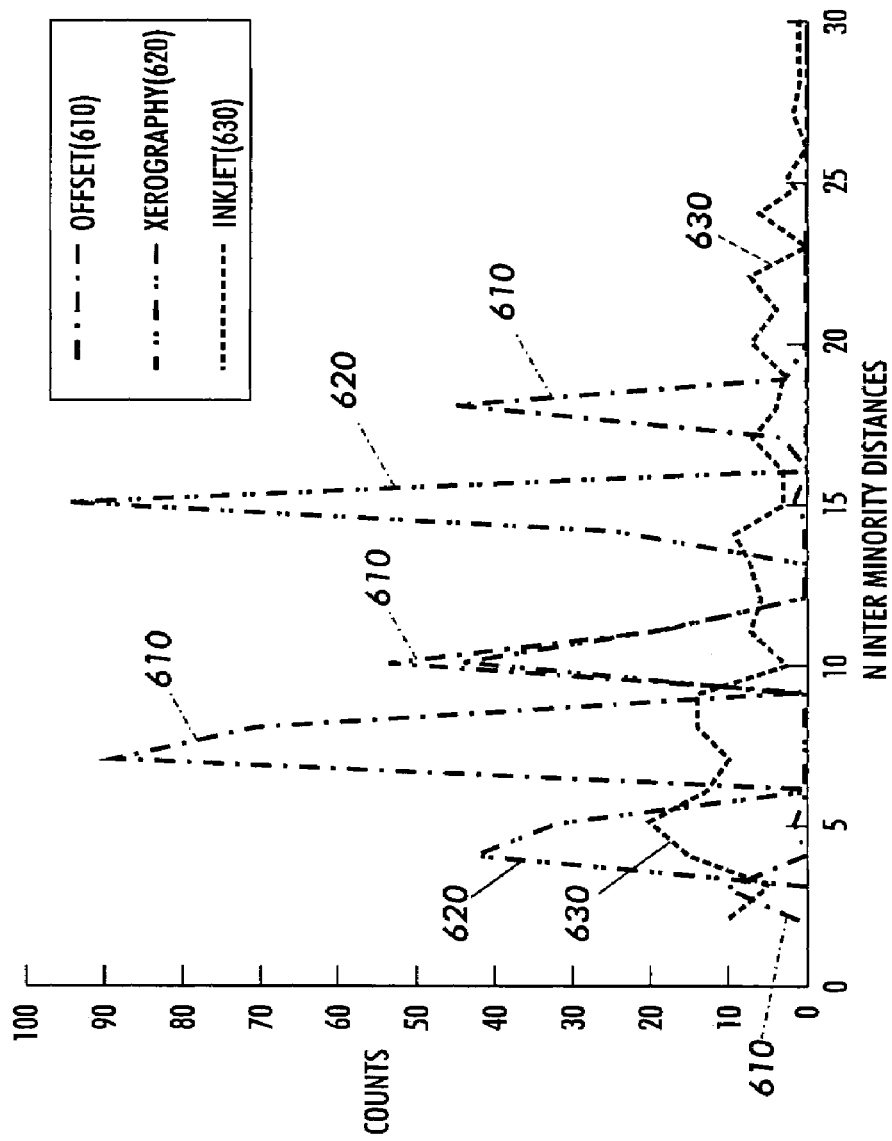
FIG. 8 illustrates one exemplary embodiment of a histogram of inter-minority distance.

FIG. 8 illustrates one exemplary embodiment of a histogram of the inter-maxima/minima distance between minority pixels for a single image area formed using an inkjet image marking process, a xerographically-formed image marking process and an offset image marking process, based on the results generated in step S1500 of FIG. 4. As shown in FIG. 8, different media types may be distinguished. For example, the inkjet image marking process curve 630 is clearly distinguishable, having a strongly different frequency characteristic with no clear periodicity. On the other hand, the offset image marking process curve 610 and the xerographically-formed image marking process curve 620 both show strong periodicity.

Further, as shown in FIG. 8, the offset image marking process curve 610 and the xerographic image marking process curve 620 are further distinguishable by the higher frequency, i.e., closer spacing of the peaks, in the offset image marking process curve 610, shown as peaks to the left of xerographic image marking process curve 620 in FIG. 8. A secondary indicator identifying the xerographic image marking process curve 620 is the high amplitude of the high frequency sidelobe at a periodicity of 4-5 pixels.

Figure 9:
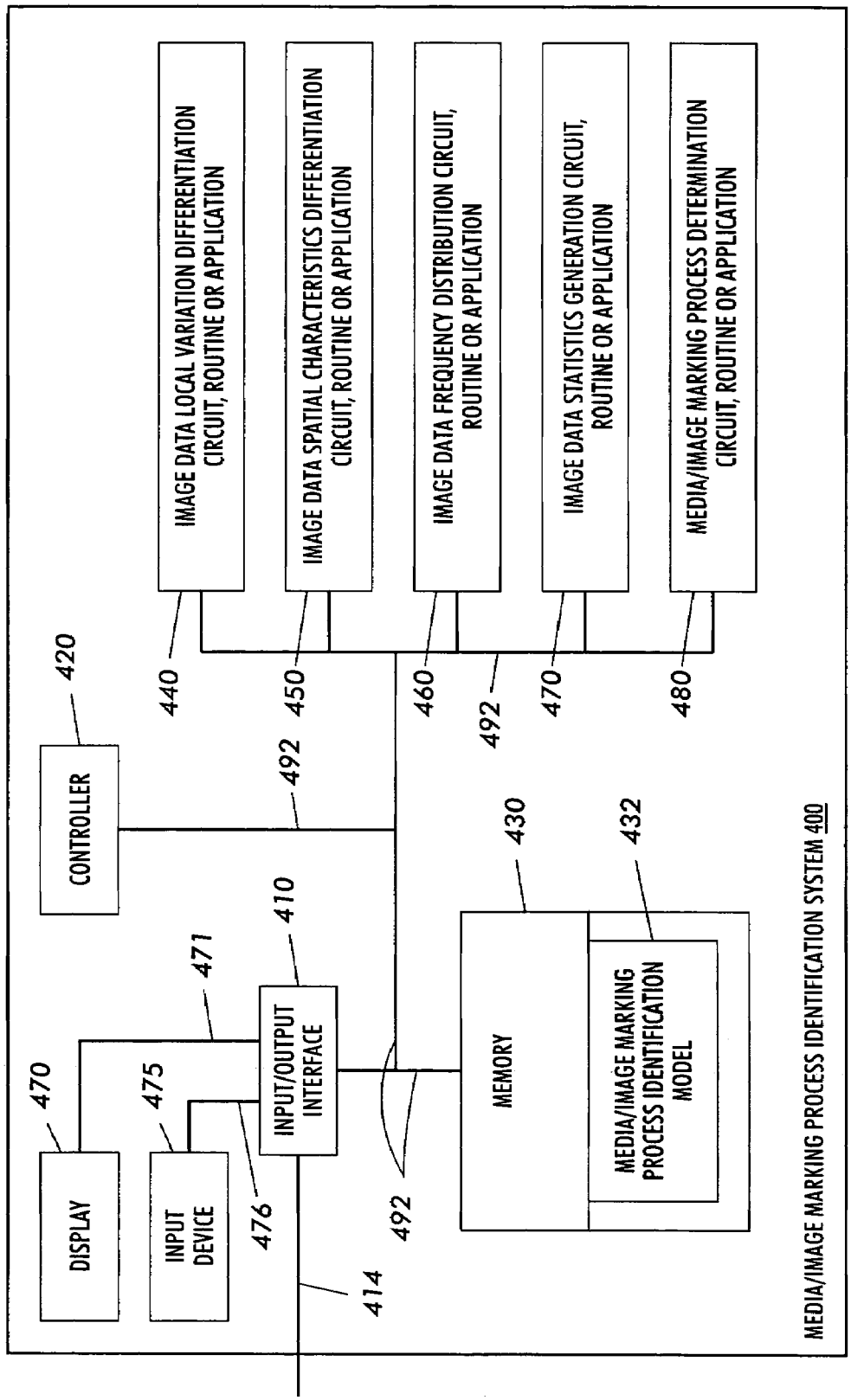
FIG. 9 is a functional block diagram of one exemplary embodiment of a system used to identify media/image marking process according to this invention.

FIG. 9 illustrates a functional block diagram of one exemplary embodiment of the media/image marking process identification system 400 according to this invention. The media/image marking process identification system 400 may be a stand alone system or may be connected to a network (not shown) via the link 414. The link 414 can be any known or later developed device or system for connecting the media/image marking process identification system 400 to the network, including a connection over public switched telephone network, a direct cable connection, a connection over a wide area network, a local area network or a storage area network, a connection over an intranet or an extranet, a connection over the Internet, or a connection over any other distributed processing network or system. In general, the link 414 can be any known or later-developed connection system or structure usable to connect the media/image marking process identification system 400 to the network.

As shown in FIG. 9, the media/image marking process identification system 400 may include one or more display devices 470 usable to display information to one or more users, and one or more user input devices 475 usable to allow one or more users to input data into the media/image marking process identification system 400. The one or more display devices 470 and the one or more input devices 475 are connected to the media/image marking process identification system 400 through an input/output interface 410 via one or more communication links 471 and 476, respectively, which are similar to the communication link 414 above.

In various exemplary embodiments, the media/image marking process identification system 400 includes one or more of a controller 420, a memory 430, an image data local variation differentiation circuit, routine or application 440, an image data spatial characteristics differentiation circuit, routine or application 450, an image data frequency distribution circuit, routine or application 460, an image data statistics generation circuit, routine or application 470, and a media/image marking process determination circuit, routine or application 480, which are interconnected over one or more data and/or control buses and/or application programming interfaces 492. The memory 430 includes one or more of a media/image marking process identification model 432.

The controller 420 controls the operation of the other components of the media/image marking process identification system 400. The controller 420 also controls the flow of data between components of the media/image marking process identification system 400 as needed. The memory 430 can store information coming into or going out of the media/image marking process identification system 400, may store any necessary programs and/or data implementing the functions of the media/image marking process identification system 400, and/or may store data and/or user-specific information at various stages of processing.

The memory 430 includes any machine-readable medium and can be implemented using appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the media/image marking process identification model 432 which the media/image marking process identification system 400 employs to identify the media and/or image marking process used to process a particular medium is based on the image data analysis techniques discussed above to determine local variations of the input data, identify image data spatial characteristics, determine image data frequency distributions, and the like.

With reference to FIGS. 1 and 9, the image data local variation differentiation circuit, routine or application 440 is activated by the controller 420 to differentiate between a continuous tone image marking proces's 120 and a halftone image marking process 125 in a scanned image by examining local variations of the scanned image input data to determine whether there is low local/spatial variation 115 in the scanned image data or high local/spatial variation 116 in the scanned image data.

This distinction coincides with the distinction between a photograph or other analog image marking process and a binary image marking process. That is, determining continuous tone image data would imply that the image marking process for the scanned image data is a photo process, i.e., that the image is a photo 121.

As discussed above, detecting a halftone marking process 125 would imply that the image marking process for the scanned image data is an ink-jet marking process 140, a xerographic marking process 145, an offset marking process 146, or the like.

The image data spatial characteristics differentiation circuit, routine or application 450 is activated by the controller 420 to differentiate between the various halftone image marking processes 140, 145 and 146 by examining the spatial characteristics of the scanned image data to determine whether the data has a dispersed/aperiodic character 135 or a clustered/periodic character 136.

Detecting data having a dispersed/aperiodic character would imply that the image marking process for the scanned image data is an ink-jet marking process 140, i.e., that the image is an ink-jet image 141. On the other hand, detecting data having a clustered/periodic character would imply that the image marking process for the scanned image data is a xerographic marking process 145, an offset marking process 146, or the like.

The image data frequency distribution circuit, routine or application 460 is activated by the controller 420 to differentiates between a xerographic marking process 160 and an offset marking process 165 by examining the data frequency distribution or internal structure of the scanned image data. Image data internal structure examples that may be considered include determining whether the image data has a line structure as contrasted with a rotated structure, whether the halftone dots have a high frequency structure versus a low frequency structure, and whether the halftone screen noise is high or low.

Detecting image data having a low frequency/high noise character 155 would imply that the image marking process for the scanned image data is a xerographic marking process 160 that was used to create a xerographic image 161. On the other hand, detecting image data having a high frequency/low noise character 156 would imply that the image marking process for the scanned image data is an offset, or lithographic, marking process 165 that was used to generate an offset printed/lithographic image 166.

The image data statistics generation circuit, routine or application 470 is activated by the controller 420 to generate one or more data statistics of the image data, as discussed above, which are then are analyzed by one or more of the circuits, routines or applications 420, 430, 440.

The media/image marking process determination circuit, routine or application 480 is activated by the controller 420 to determine the type of image marking process used to process the image data evaluated or analyzed.

A fully automated approach for detecting the input image marking process based on the spatial statistics of the scanned image has been described. Because the spatial statistics of the scanned image are highly correlated with the underlying reproduction process, the methods and systems according to various exemplary embodiments of the invention allow for a reliable classification of the type of the image marking process. It is also well understood that any automated approach can be used in a semi-automatic fashion to aid a user, either by preferentially guiding user decisions, by setting system defaults, by alerting users to discrepancies, or the like.

Although the above discussion first selects blocks of pixels to be used for image analysis, then creates statistical data indicative of a marking process, then creates a dispersion metric for the blocks, then creates a periodicity metric, this order may be changed, especially if the input image marking processes have some sort of pre-classification. Moreover, because the metrics described above have been shown to be sequentially derived, some classification decisions may be made earlier than others. It should also be noted that a periodicity metric may also be considered to be a noise metric because a periodicity metric compares amplitudes and harmonics.

While this invention has been described with reference to a color scanner, the invention is not limited to such an embodiment. The invention may be applied to scanned image data captured at a remote location or to image data captured from a hard copy reproduction by a device other than a scanner, for example a digital camera. The invention may be practiced on any color reproduction device, such as, for example a color photocopier, and is also not intended to be limited to the particular colors described above.

While this invention has been described in conjunction with specific embodiments outlined above, it is evident that many alternatives, modifications and variations will be apparent to those skilled in the art. Accordingly the preferred embodiments of the invention as set forth above are intended to be illustrative and not limiting. Various changes may be made without departing from the spirit and scope of the invention as defined in the following claims.

What is claimed is:

1. A method of analyzing a printed image, comprising:
scanning the printed image;
generating an event map for one or more input data blocks in the scanned printed image;
determining data statistics of the printed image from at least the event map generated;
determining spatial variations in the printed image based on the data statistics;
determining a histogram and a frequency distribution based on the data statistics; and
determining an image marking process used to create the printed image based on the determined spatial variations, the histogram and the frequency distribution in the printed image,
wherein the event map is generated by determining frequency distribution of colors, generating a first color level set, and generating a first binary image by setting dots pixels having the first color level set to 1 otherwise to 0, or by
generating a gray value for an image channel, calculating a threshold value for the image channel, generating a second color level set, and generating a second binary image channel by setting point pixels having the second color level set to 1 otherwise 0.

2. The method of claim 1, wherein spatial variations include local spatial variations of the scanned image data.

3. The method of claim 2, wherein a low value of the local spatial variation of the scanned image data is indicative of a photographic image marking process or background noise.

4. The method of claim 2, wherein a high value of the local spatial variation of the scanned image data is indicative of a halftone image marking process.

5. The method of claim 1, wherein the histogram includes a periodicity/variance distribution.

6. The method of claim 5, wherein a dispered/aperiodic distribution of the scanned image data is indicative of an inkjet image marking process.

7. The method of claim 5, wherein a clustered/periodic distribution of the scanned image data is indicative of a xerographic image marking process or an offset image marking process or a lithographic image marking process.

8. The method of claim 1, wherein spatial variations include at least one of an area variance and an area variance to mean ratio.

9. The method of claim 8, wherein a xerographic image marking process has low screen frequency and high screen noise characteristics.

10. The method of claim 8, wherein an offset or a lithographic image marking process has high screen frequency and low screen noise characteristics.

11. The method of claim 1, wherein scanning the printed image comprises dividing scanned printed image into image data blocks.

12. The method of claim 11, wherein scanning the printed image further comprises selecting one or more image data blocks.

13. The method of claim 1, wherein determining the image marking process based on the determined spatial variations comprises determining at least one set of data statistics for the scanned printed image.

14. The method of claim 13, wherein determining at least one set of data statistics comprises determining one or more of an area average or mean of pixels in an image data block of the scanned printed image, an area variance of the pixels for the image data block, extreme minima value, $min_a$, of the pixels for the image data block, extreme maxima value, $max_a$, of the pixels for the image data block.

15. The method of claim 14, further comprising performing data evaluations using the determined one or more data statistics.

16. The method of claim 15, wherein performing data evaluations comprises one or more of determining a ratio of the area variance to mean determined for a given block, calculating a distribution of the mean values for large pixel areas, comparing the calculated mean value to the determined $min_a$ and/or $max_a$ values, and determining a distance between maxima/minima.

17. The method of claim 16, wherein determining an image marking process comprises determining histogram based on inter maxima/minima distances.

18. A method of determining an image marking process used to create a printed image, comprising:
scanning the printed image;
generating an event map for one or more input data blocks in the scanned printed image;
determining data statistics of the printed image from at least the generated event map;
determining local spatial variations in the printed image based on the data statistics;
determining a histogram and a frequency distribution based on the data statistics; and
determining the image marking process used to create the printed image based on the determined local spatial variations, the histogram and the frequency distribution in the printed image,
wherein an event map is generated by
determining frequency distribution of colors, generating a first color level set, and generating a first binary image by setting dots pixels having the first color level set to 1 otherwise to 0, or by
generating a gray value for an image channel, calculating a threshold value for the image channel, generating a second color level set, and generating a second binary image channel by setting point pixels having the second color level set to 1 otherwise 0.

19. The method of claim 18, wherein the histogram includes at least a periodicity/variance distribution.

20. The method of claim 18, wherein spatial variations include at least one of an area variance and an area variance to mean ratio.

21. The method of claim 18, wherein determining the image marking process based on the determined local spatial variations comprises determining one or more data statistics for the scanned printed image.

22. The method of claim 21, wherein determining one or more data statistics comprises determining one or more of an area average or mean of pixels in an image data block of the scanned printed image, an area variance of the pixels for the image data block, extreme minima value, $min_a$, of the pixels for the image data block, extreme maxima value, $max_a$, of the pixels for the image data block.

23. The method of claim 22 further comprising performing data evaluations using the determined one or more data statistics.

24. The method of claim 23, wherein performing data evaluations comprises one or more of: determining a ratio of the area variance to mean determined for a given block, calculating a distribution of the mean values for large pixel areas, comparing the calculated mean value to the determined $min_a$ and/or $max_a$ values, and determining a distance between maxima/minima, and determining the histogram based on inter maxima/minima distances.

25. A computer-readable medium that is encoded with computer-readable instructions and provides instructions for determining an image marking process used to create a printed image, instructions, which when executed by a processor, cause the processor to perform operations comprising:
scanning the printed image;
generating an event map for one or more input data blocks in the scanned printed image;
determining data statistics of the printed image from at least the event map generated;
determining local spatial variations in the printed image based on the data statistics;
determining a histogram and a frequency distribution based on the data statistics; and
determining the image marking process used to create the printed image based on the determined local spatial variations, the histogram and the frequency distribution in the printed image.
wherein an event map is generated by
determining frequency distribution of colors, generating a first color level set, and generating a first binary image by setting dots pixels having the first color level set to 1 otherwise to 0. or by
generating a gray value for an image channel, calculating a threshold value for the image channel, generating a second color level set, and generating a second binary image channel by setting point pixels having the second color level set to 1 otherwise 0.

26. The computer-readable medium according to claim 25, wherein the histogram includes at least a periodicity/variance distribution.

27. The computer-readable medium according to claim 25, wherein spatial variations include at least one of an area variance and an area variance to mean ratio.

28. The computer-readable medium according to claim 25, wherein determining the image marking process based on the determined local spatial variations comprises determining one or more data statistics for the scanned printed image.

29. The computer-readable medium according to claim 28, wherein determining one or more data statistics comprises determining one or more of an area average or mean of pixels in an image data block of the scanned printed image, an area variance of the pixels for the image data block, extreme minima value, $min_a$, of the pixels for the image data block, extreme maxima value, $max_a$, of the pixels for the image data block.

30. The computer-readable medium according to claim 29 further comprising performing data evaluations using the determined one or more data statistics.

31. The computer-readable medium according to claim 30, wherein performing data evaluations comprises one or more of: determining a ratio of the area variance to mean determined for a given block, calculating a distribution of the mean values for large pixel areas, comparing the calculated mean value to the determined $min_a$ and/or $max_a$ values, and determining a distance between maxima/minima and determining the histogram based on inter maxima/minima distances.

32. A media/image marking process identification system for a printed page, comprising:
 a memory; and
 a media/image marking process identification determination circuit, routine or application that identifies at least one of a media type for the printed page or an image marking process used to process the printed page, by processing the printed page to generate an event map for one or more input data blocks in the printed image, determine data statistics of the printed image from at least the event map generated; statistically analyzing the data statistics of the printed image; determining local spatial variations in the printed image based on the data statistics;
 determining a histogram and a frequency distribution based on the data statistics; and
 determining the media/image marking process used to create the printed image based on the determined spatial variations, the histogram and the frequency distribution in the printed image,
 wherein the event map is generated by
  determining frequency distribution of colors, generating a first color level set, and generating a first binary image by setting dots pixels having the first color level set to 1 otherwise to 0, or by
  generating a gray value for an image channel, calculating a threshold value for the image channel, generating a second color level set, and generating a second binary image channel by setting point pixels having the second color level set to 1 otherwise 0.

33. The media/image marking process identification system according to claim 32, wherein local spatial variations include at least one of a variance and a variance to a mean ratio.

34. The media/image marking process identification system according to claim 32, wherein the histogram includes a periodicity/variance distribution.

35. The media/image marking process identification system according to claim 32, wherein determining the media/image marking process based on the determined local spatial variations comprises determining one or more data statistics for the scanned printed image.

36. The media/image marking process identification system according to claim 35, wherein determining one or more data statistics comprises determining one or more of an area average or mean of pixels in an image data block of the scanned printed image, an area variance of the pixels for the image data block, extreme minima value, $min_a$, of the pixels for the image data block, extreme maxima value, $max_a$, of the pixels for the image data block.

37. The media/image marking process identification system according to claim 36 further comprising performing data evaluations using the determined one or more data statistics.

38. The media/image marking process identification system according to claim 37, wherein performing data evaluations comprises one or more of: determining a ratio of the area variance to mean determined for a given block, calculating a distribution of the mean values for large pixel areas, comparing the calculated mean value to the determined $min_a$ and/or $max_a$ values, and determining a distance between maxima/minima, and determining the histogram based on inter maxima/minima distances.

* * * * *